Nov. 3, 1925.
A. A. SHAFER
1,560,487
AUTOMATIC SCREW THREADING MACHINE
Filed June 30, 1923 4 Sheets-Sheet 1
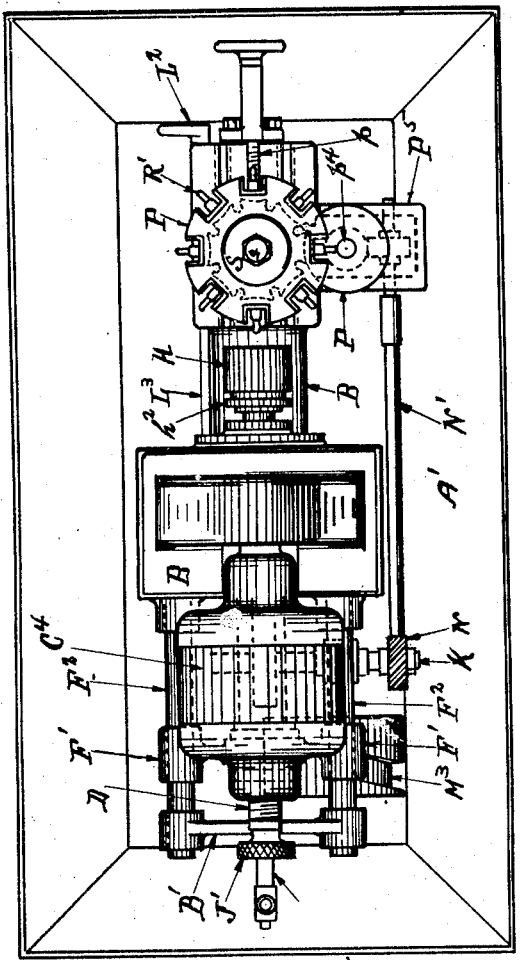
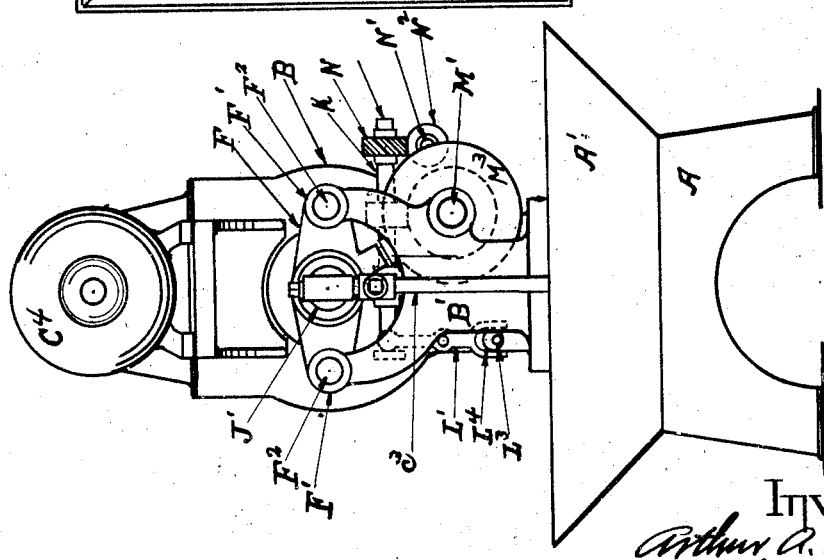
Inventor.
Arthur A. Shafer Nov. 3, 1925.
A. A. SHAFER
1,560,487
AUTOMATIC SCREW THREADING MACHINE
Filed June 30, 1923     4 Sheets-Sheet 2
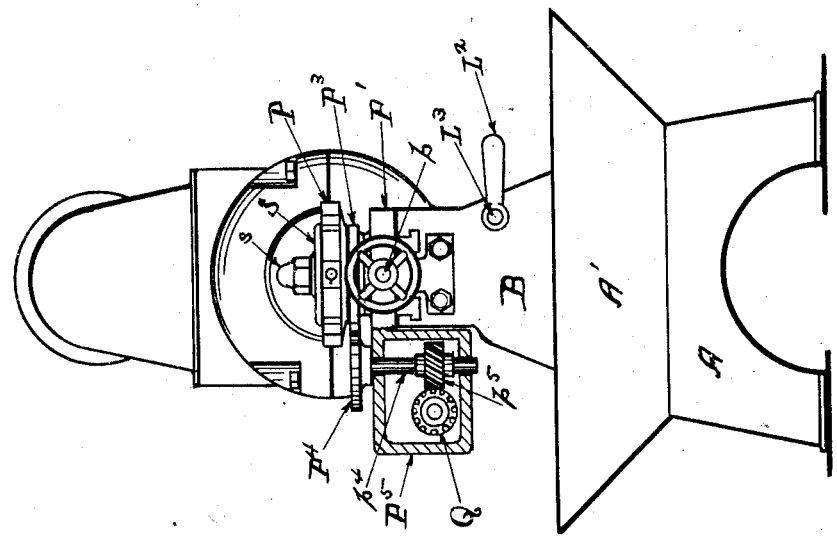
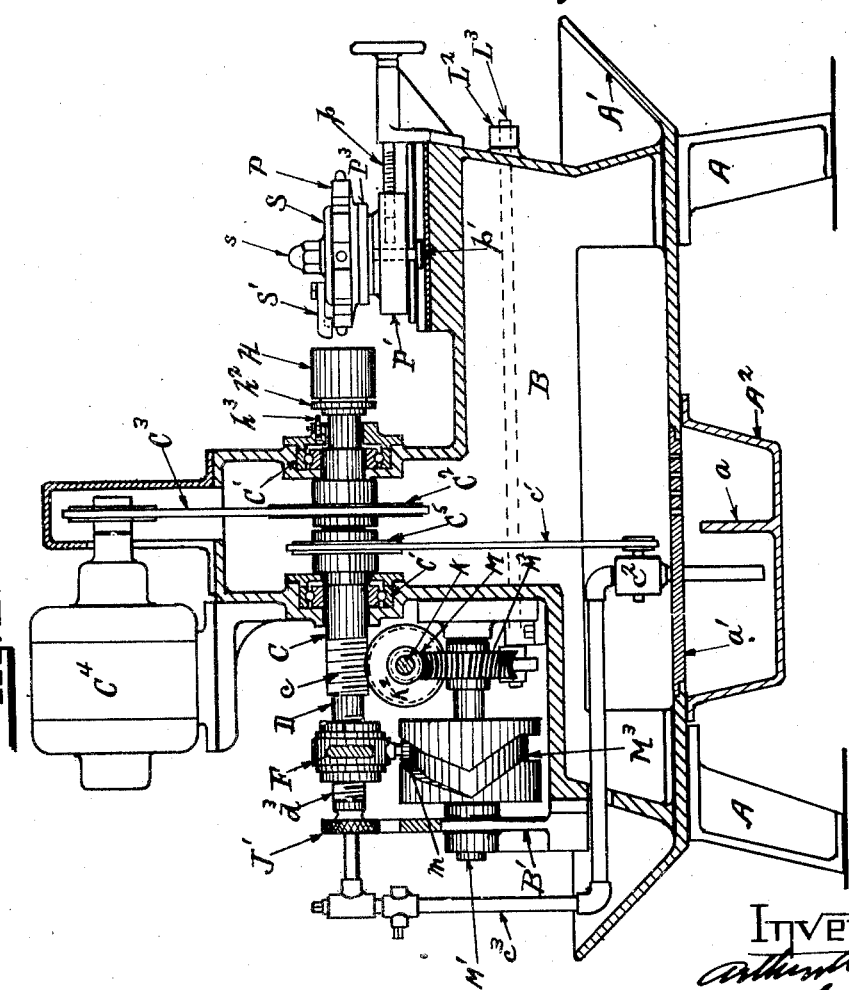

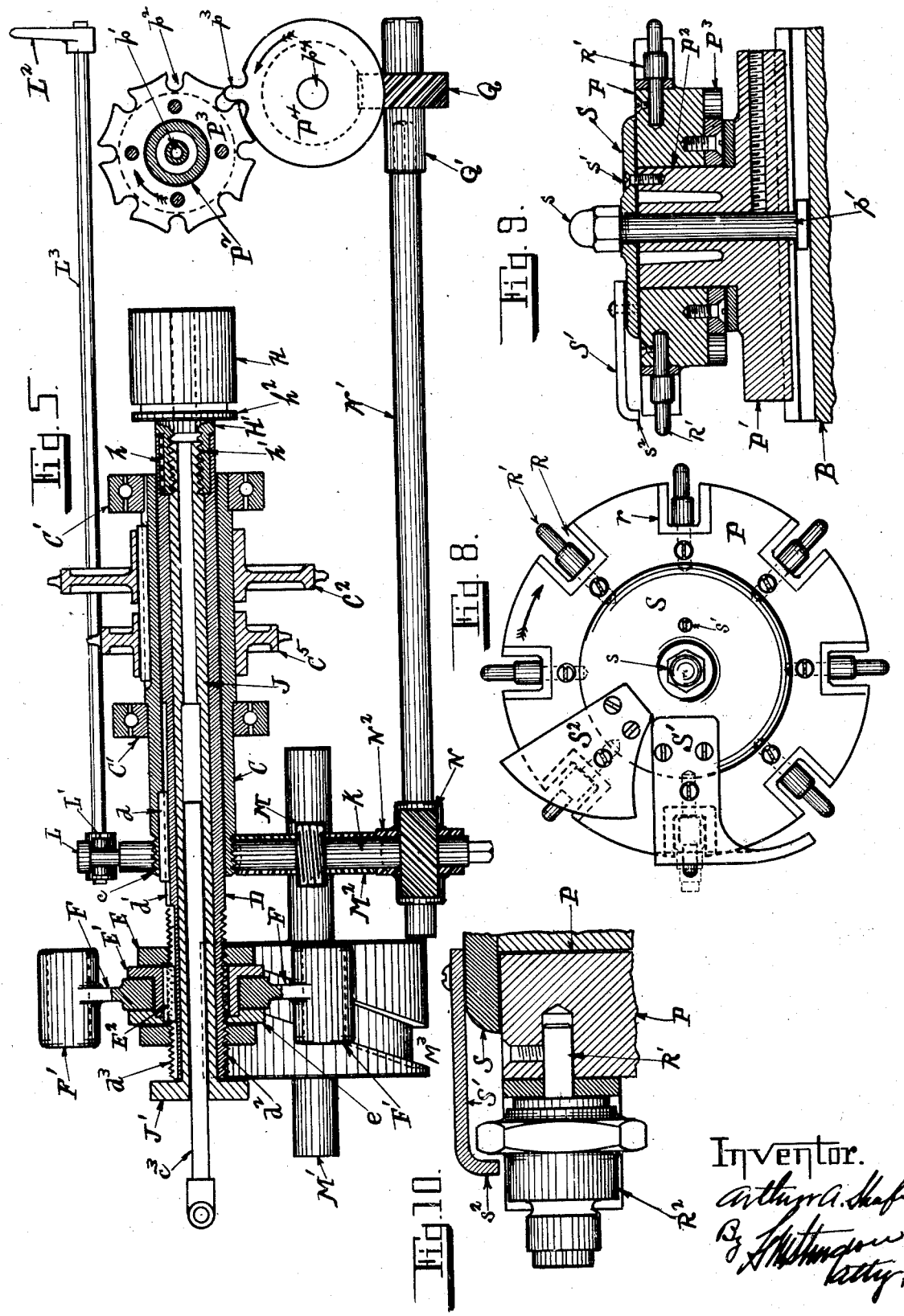

Nov. 3, 1925.  
A. A. SHAFER  
1,560,487
AUTOMATIC SCREW THREADING MACHINE
Filed June 30, 1923  4 Sheets-Sheet 4
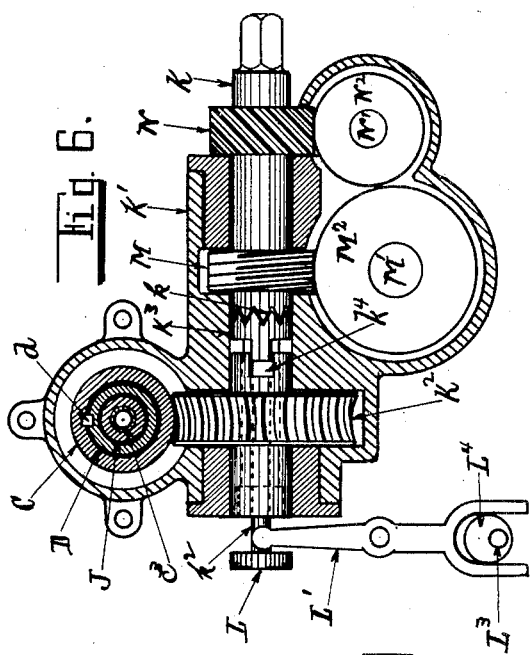
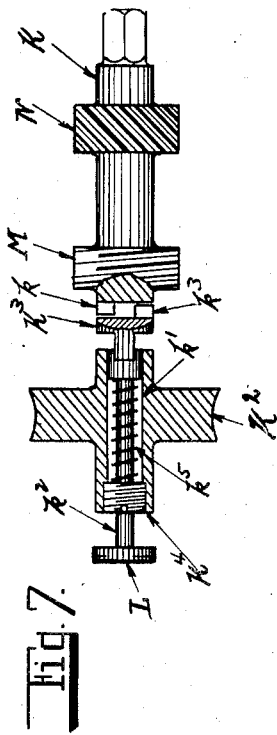
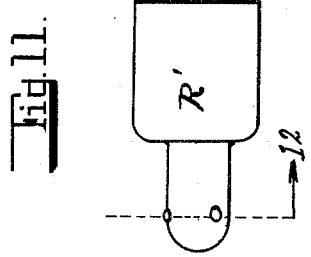
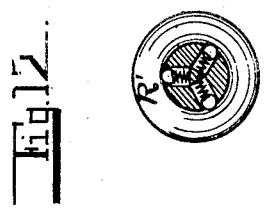
Inventor.
Arthur A. Shafer
By J. M. Sturgeon
Atty Patented Nov. 3, 1925.

1,560,487

UNITED STATES PATENT OFFICE.

ARTHUR A. SHAFER, OF ERIE, PENNSYLVANIA, ASSIGNOR TO RICKERT SHAFER COMPANY, OF ERIE, PENNSYLVANIA, A CORPORATION OF PENNSYLVANIA.

AUTOMATIC SCREW-THREADING MACHINE.

Application filed June 30, 1923. Serial No. 648,725.

*To all whom it may concern:*

Be it known that I, ARTHUR A. SHAFER, a citizen of the United States, residing at Erie, in the county of Erie and State of Pennsylvania, have invented certain new and useful Improvements in Automatic Screw-Threading Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to automatic screw threading machines of the type wherein work pieces are successively presented to the threading die, and after being threaded are dropped into a receptacle, said operation being repeated as long as is desired.

The object of this invention is to construct mechanism adapted to support the work piece on the axial line of the threading die, and means to impart to the threading die both rotary and longitudinal reciprocal movement, the rotary movement being continuous, and the longitudinal reciprocations being timed with relation to the advancing of the die holder during the cutting of threads on the work piece and recession of the same after the threading operation.

The features of this invention are hereinafter fully described and pointed out and are illustrated in the accompanying drawings, in which:

Figure 1 is a rear end elevation of a threading machine embodying this invention.

Figure 2 is a plan view of the same.

Figure 3 is a vertical central section of the machine showing parts thereof in elevation.

Figure 4 is a front end elevation showing the front wall of one of the gear cases broken away.

Figure 5 is a plan view of the gear mechanism removed from the frame of the machine, and showing the main spindle mechanism in horizontal longitudinal section.

Figure 6 is a vertical longitudinal section of the gear case enclosing the worm gear and clutch mechanism of this machine.

Figure 7 shows the worm shaft partly in central section, showing the safety clutch mechanism.

Figure 8 is a plan view of the turret mechanism equipped for threading sparkplugs and other similar cylindrical objects.

Figure 9 is a transverse vertical central section of the same.

Figure 10 is a vertical central section of a fragment of the same enlarged, showing a spark-plug body in position thereon.

Figure 11 is a side elevation of one of the supporting work holding parts mounted in the turret shown in Fig. 8, on an enlarged scale.

Figure 12 is a transverse section of the same on the line 12 in Fig. 11.

In these drawings A indicates the base frame of the machine, upon which a drip-pan A' is placed. Under this drip-pan is suspended a tank $A^2$, see Fig. 3, which is provided with a transverse division wall $a$ the upper edge of which is somewhat lower than the side walls of the tank $A^2$. In the bottom of the drip-pan A' is inserted a screen plate $a'$, which is provided with openings over said tank $A^2$ so that oil or other lubricant which flows through said openings will drop into said tank $A^2$ at one side of the division wall $a$ and when that side of the tank fills to the top of said division wall the oil will flow over the top of the division wall $a$ into the opposite end of the tank A' from which it can be pumped by the circulating pump, as hereinafter described. The division wall $a$ thus forms a settling basin wherein metal cuttings which pass through the screen $a'$ will settle to the bottom and only clear oil will flow over the division wall, so that the pump mechanism will not become clogged thereby.

Within the drip-pan A' is placed the machine frame B, in which is mounted the operating mechanism hereinafter described.

C, indicates the spindle mechanism of the machine, which is shown in longitudinal section in Fig. 5. This mechanism is mounted in anti-friction bearings C' in the frame B of the machine.

In Fig. 5, C indicates the outside spindle sleeve shaft which is mounted in the antifriction bearings hereinbefore referred to, and is provided at one end with a worm thread $c$ thereon. Upon the sleeve shaft C is placed a driving sprocket wheel $C^2$ from which a chain belt $C^3$ extends upwardly, see Fig. 3, to a suitable pulley on the shaft (not shown) of the motor $C^4$ secured upon a bracket upon the upper portion of the machine frame B. Upon the sleeve shaft C, another sprocket wheel $C^5$ is placed from which a chain belt $c'$ extends to a pulley upon the shaft of a pump mechanism $c^2$, of ordinary construction from which a suction pipe extends into the oil tank $A^2$ for the purpose hereinafter described.

Referring again to Figure 3, D indicates a hollow sleeve slidably mounted within the sleeve shaft C, and is made to revolve therewith by reason of the key $d$ which operates in a key-way $d'$ cut in the exterior surface of the sleeve D. This sleeve D is provided with screw threads $d^2$ on one end thereof. A key-way $d^3$ is also cut in this sleeve D across the threads $d^2$. Upon these threads $d^2$ a jam nut E is placed, and then a flanged cylinder $E'$, is slid over the threads $d^2$ against the jam nut E, said cylinder being provided with an internal key way to receive a key $E^2$ so that the cylinder $E'$ will revolve with the sleeve D. Mounted on this flanged cylinder $E'$ are a pair of cross-arms F which terminate in sliding sleeves $F'$ through which supporting slide way rods $F^2$ pass, the ends thereof being supported in the frame B and bracket $B'$, see Figs. 1 and 2, so that said flanged cylinder $E'$ will revolve within said cross arms. Abutting against the hub of the cross arms F and against the annular edge of the flanged cylinder $E'$ is a ring washer $e$ which also is provided with a key way to receive the key $E^2$ to cause it to revolve with the flanged cylinder $E'$, and upon the threads $d^2$ a nut $E^3$ is placed which firmly clamps the enclosed mechanism against the jam nut E. It will be evident from the drawing of Fig. 5, and the foregoing description that the cross arms F can be located at such point upon the sleeve D, within the limits of the threads $d^2$ thereon, as may be desired.

The function of the cross-arms and sleeves F—$F'$ is to support the rear end of the sleeve D and carry the roller $m$, see Figs. 1 and 3, so that it will engage the cam-slot in the drum $M^3$, by means of which the spindle D is given its longitudinal movement, the cross arms and sleeves F—$F'$ holding the roller $m$ rigidly against the rotation of said drum.

Within the opposite end of the sleeve D is placed the shank of a threading die holder H, and a key $h$ is provided to cause said die holder to rotate with said sleeve. The die holder H is of the automatic self closing and opening type, and is fully illustrated and described in U. S. patent issued upon the application of Rudolph A. Boehm, December 1, 1914, No 1,119,676, in which when the forward movement of the die holder is arrested, the continued rotation of the chasers upon the threads cut upon the work piece causes the chasers to spring open free from the work piece, and when the die holder is caused to recede from the work, a reverse pressure against mechanism at the rear end of the die holder causes the chasers to close ready for the next cut.

For use in this machine the shank $H'$ of the die holder is provided with a longitudinal opening therethrough, in which internal threads $h'$ are cut, to receive threads on the end of a tube J which is inserted in the sleeve D, and is provided with a head $J'$ which abuts against the end of the sleeve D, so that when the tube J is screwed into the shank $H'$ of the die holder H it is drawn firmly into the sleeve D.

From the pump mechanism $c^2$ an oil supply pipe $c^3$ leads into the tube J so that oil therefrom will flow through the shank $H'$ into the die holder H.

Across the rear end of the machine a transverse shaft K is mounted in suitable bearings $K'$ secured to the frame B of the machine, upon which a worm gear wheel $K^2$ is placed which intermeshes with the worm threads $c$ on the sleeve shaft C, see Figs. 3 and 6. The shaft K consists of two portions, one portion having annular angular teeth $k$ cut therein, and the other portion thereof has central opening $k'$ therethrough in which a sliding rod $k^2$ is placed having thereon a cylindrical body $K^3$, which likewise is provided with annular angular teeth $k^3$ which engage the teeth $k$ on the portion K of the shaft. The part $K^3$ is provided with a square shoulder which slidably enters square notches $K^4$ in the portion of the shaft upon which the worm gear wheel $K^2$ is secured. Upon the rod $k^2$ a spring $k^5$ is placed which is secured by means of a threaded bushing $K^4$, so that the spring $k^5$ presses the toothed part $k^3$ firmly against the teeth $k$ on the portion of the shaft K, so that under ordinary load the worm gear wheel $K^2$ will rotate the shaft K but an excessive load thereon will cause the teeth $k$ and $k^3$ to slip, thereby causing a chattering noise to give an alarm.

The sliding rod $k^2$ is provided with a flat head, L, with which an operating lever $L'$ engages, so that the clutch can be opened, when desired, and the train of gears, hereinafter described, operated thereby, stopped.

To manually operate the safety clutch just described, a lever $L^2$, see Figs. 2, 3 and 4, is provided at the front end of the machine, from which a rock-shaft $L^3$ extends to an eccentric $L^4$, see Figs. 1 and 6, which engages the lever $L'$ so that by operating the lever $L^2$ the clutch can be opened or closed. The parts of this safety clutch are maintained in alignment by means of the bearing $K'$.

Upon the shaft K is placed a worm wheel M, and a spiral gear wheel N, see Figs. 1, 2 and 6.

Upon a shaft M' mounted longitudinally on the frame B of the machine, is a worm gear wheel M², which intermeshes with the worm wheel M, and upon the shaft M' is secured a drum having a cam slot M³ cut in the periphery thereof, in which a roller $m$ upon a stud post projecting from the hub of the cross arms F operates, and by which the sleeve D in the spindle sleeve shaft C is caused to reciprocate longitudinally as it rotates. The angular courses of this cam slot M³ are arranged to coincide with the pitch of the thread being cut by the threading die H, and with the desired speed of advancing toward the work piece, and receding therefrom.

Mounted in suitable bearings there is a shaft N' upon which a spiral gear wheel N² is secured, see Figs. 1, 2 and 5, which gear wheel intermeshes with the spiral gear wheel N.

The shaft N' extends forward to the front end of the machine where it connects with the turret operating gear, as hereinafter described.

On the front end of the machine frame B is placed a rotatable turret mechanism, P, which is longitudinally adjustable thereon, by means of an adjusting screw $p$ in the usual manner, and is clamped in place by means of a central bolt $p'$, see Figs. 2, 3 and 9. This turret mechanism consists of a base P' which rests upon the frame B, and is provided with a pivot post P², upon which the revolving ring P, turns, secured to the under side of the turret ring P, is a gear wheel P³ of the type known as a "Geneva" wheel, see Fig. 5, which is provided with spaced notches $p^2$, to receive the single cog $p^3$ on the rotating disc $p^4$. The disc P⁴ is secured upon a vertical shaft $p^4$ which extends through a gear case P⁵ secured to the base P' of the turret mechanism.

Within this gear case there is secured upon the shaft $p^4$ a spiral gear wheel $p^5$ which intermeshes with the spiral gear wheel Q secured upon a sleeve shaft Q' which is journaled in the gear case P⁵. This sleeve shaft Q' is connected with the shaft N', see Figs. 2 and 5 by means of a sliding connection as indicated by broken lines in Fig. 5. The shaft N' has a constant rotative motion imparted to it by the shaft K which causes the disc P⁴ to rotate in the direction of the arrow, and at each revolution thereof the cog $p^3$ engages a notch $p^2$ in the Geneva wheel P³ and causes it and the turret ring P to revolve in the direction of the arrow thereon, one space. The edge of the Geneva wheel P³, between the notches $p^2$ is formed to fit curved perimeter of the disc P⁴, so that when the cog $p^3$ leaves a notch $p^2$ in the wheel P³, the wheel is held stationary by the disc P⁴ until the cog $p^3$ engages the next notch, thus imparting a step-by-step rotation of the turret.

In the edge of the turret ring P are provided rectangular recesses R which are lined with hardened metal U-shaped plates $r$, see Figs. 8, 9 and 10, and centrally in each recess is placed a mandrel R' adapted to support a hollow work piece, such as a spark-plug body R², see Fig. 10, so that the hexagon portion thereof will engage the walls of the rectangular recesses to prevent the work piece from turning on the mandrel R'. On top of the turret ring P is placed a plate S which is retained by a nut $s$, and prevented from rotating by means of screw $s'$ which passes therethrough and into the post P². Secured on the plate S there is an arm S' which projects over the work piece, R², the edge $s^2$ thereof being turned down in front of the hexagonal portion of the work piece, and adapted to prevent the same from being drawn off of the mandrel during the threading process, as hereinafter described. There is also provided another arm S² which is secured upon the plate S, which engages the rear surface of the work piece when the turret carries it forward after the threading process, and causes it to slide off of the mandrel.

While the turret mechanism is shown as being adapted to hold spark-plug bodies for threading it will be evident that it can be adapted for holding other articles desired to be threaded without material change in the principle of operation.

In Figs. 2, 3, and 5 the threading die holder H is shown as provided with a die closing flange $h^2$ which, when the die holder is caused to recede from the work, engages a roller $h^3$ in the frame of the machine, see Fig. 3, which causes the closing mechanism in the die holder to operate to close the chaser, (not shown) ready for the next cut.

In operation the machine is started causing the die holder to rotate; the worm threads on the sleeve shaft C through its associated train of gears causes the cam drum to rotate in timed relation to the predetermined pitch of the thread to be cut by the die holder, and the cam slot M³ in said drum causes the die sleeve D to move longitudinally to carry the die holder H toward the turret P, and also causes the shaft N' to rotate the disc P⁴, which through the Geneva gear causes the turret mechanism to revolve step-by-step in relation to the number of revolutions necessary for the die holder to cut the desired number of threads. The operator then places upon the mandrel the work piece for which the turret is designed. When the die holder has completed the threads on a work piece the cam slot M³ in the drum causes the die holder to commence its recession from the turret thereby causing the work piece R² to engage the down turned edge s² of the arm S' which prevents the work piece from being drawn off of the mandrel R' thus placing a strain on the chasers in the die holder and causing the dies to open free of the cut threads. The die holder continues its recession until the closing flange h² thereon engages the roller h³ on the body of the machine which again closes the chasers. During the recession and closing of the die holder the Geneva gear of the turret causes the next work piece thereon to be swung into threading position, and the operation is repeated. During the operation of the machine, as long as the die holder H rotates, a stream of oil is caused to flow through the spindle mechanism and die, which drips into the pan A', and thence into the tank A² as described. Should, by accident, the revolution of the turret P be stopped by any reason, the safety clutch mechanism in the shaft K will slip, thereby causing an alarm when the lever L² can be operated to open the clutch, so that there will be no strain on the turret revolving mechanism or the mechanism which causes the die holder H to reciprocate, until the cause of the trouble is removed.

Having thus fully described this invention so that others can utilize the same, it is not desired to be limited to the exact mechanism shown and described, as many modifications can be made therein without departing from the scope of the invention, therefore what is claimed as new and is desired to secure by Letters Patent is:

1. In a machine of the class described, a hollow sleeve shaft, means to cause the same to rotate, worm threads on said sleeve shaft, a hollow shaft within said sleeve shaft, adapted to receive the shank of a threading die holder in one end thereof, key and key way mechanism adapted to permit the hollow shaft to move longitudinally within said sleeve shaft while being revolved thereby, gear mechanism adapted to be actuated by said worm threads to cause said hollow shaft to reciprocate, and means to present a succession of work pieces to said threading die.

2. In a machine of the class described, a hollow shaft, a threading die holder, a shank thereon inserted into said shaft, threads on the opposite end of said hollow shaft, a jam nut thereon, a flanged cylinder slidable over said threads and abutting against said nut, key and key-way mechanism to cause said cylinder to rotate with said shaft, cross arms journaled on said cylinder, slides on the ends of said cross arms mounted on stationary slide ways, ring washer abutting against the annular edge of said cylinder and said key, and a clamping nut engaging the threads on said shaft adapted to clamp said parts against said jam nut.

3. In a machine of the class described, a hollow sleeve shaft, means to rotate said shaft, a shaft slidable within said sleeve shaft having a longitudinal opening in one end thereof, a threading die holder, a shank thereon adapted to be secured in said opening, means to cause said shaft to rotate in unison with said sleeve shaft, horizontal slide mechanism rotatably secured on said shaft, cam mechanism adapted to engage said slide mechanism to cause said shaft to move longitudinally in said sleeve shaft, and gear and shaft mechanism adapted to rotate said cam mechanism in timed relation to the rotation of said sleeve shaft.

4. In a machine of the class described, a frame, a turret base secured on said frame, a turret ring pivoted on said base and having radial recesses in the periphery thereof, radial mandrels in said recesses, a non-rotatable plate secured over said ring, an arm secured on said plate and extending over the edge of said ring at one point and adapted to retain a work piece on the mandrel under said arm, and gear mechanism to rotate said ring step-by-step.

5. In a machine of the class described, a frame, a shaft rotatable and slidably mounted therein, a threading die holder secured on said shaft, worm threads on said shaft, a transverse shaft mounted on said frame, a gear wheel on said shaft meshing with said worm threads, cam mechanism, gear mechanism to operate said cam mechanism, slide rods secured in said frame parallel with said slidably mounted rotatable shaft, cross arm mechanism slidably mounted on said slide rods and rotatably and non-slidably secured on said slidable and rotatable shaft, means on said cross arm mechanism to engage said cam mechanism whereby said slidable and rotatable shaft is caused to reciprocate longitudinally, a rotatable work holder, gear mechanism to cause the same to rotate step-by-step, and shaft and gear mechanism actuated by said transverse shaft to actuate said work holder gear.

In testimony whereof I affix my signature.

ARTHUR A. SHAFER.